(12) United States Patent
Valembois et al.

(10) Patent No.: US 6,661,331 B2
(45) Date of Patent: Dec. 9, 2003

(54) THERMAL-EFFECT CONTROLLED-RELEASE MECHANISM

(75) Inventors: Guy Valembois, Blagnac (FR); Grégory Soulier, Longages (FR)

(73) Assignee: Etienne Lacroix Tous Artifices S.A., Muret (FR)

( * ) Notice: Subject to any disclaimer, the term of this patent is extended or adjusted under 35 U.S.C. 154(b) by 0 days.

(21) Appl. No.: 10/165,659

(22) Filed: Jun. 7, 2002

(65) Prior Publication Data
US 2003/0071712 A1 Apr. 17, 2003

(30) Foreign Application Priority Data
Jun. 8, 2001 (FR) .............................. 01 07588

(51) Int. Cl.⁷ ................ H01H 37/76; H01H 85/055; G05G 17/00
(52) U.S. Cl. .............. 337/401; 337/416; 337/159; 337/232; 337/295; 403/271
(58) Field of Search ................ 337/401, 1–5, 337/140, 402, 403, 159, 160, 231, 232, 273, 279, 280–282, 291, 296, 412, 416; 403/179, 27, 271; 74/2

(56) References Cited

U.S. PATENT DOCUMENTS

| | | | | |
|---|---|---|---|---|
| 3,359,804 A | * | 12/1967 | Phillips | 74/2 |
| 3,597,809 A | * | 8/1971 | Crane | 16/48.5 |
| 3,613,795 A | * | 10/1971 | Amicone et al. | 169/42 |
| 3,695,116 A | * | 10/1972 | Baur | 74/2 |
| 3,779,004 A | * | 12/1973 | Gloeckler | 59/93 |
| 3,863,720 A | * | 2/1975 | Young | 169/59 |
| 4,055,829 A | * | 10/1977 | Ruegsegger | 337/416 |
| 4,174,015 A | * | 11/1979 | Farcinade | 180/268 |
| 4,346,554 A | * | 8/1982 | Glinecke | 59/93 |
| 4,405,914 A | * | 9/1983 | Ruegsegger | 337/152 |
| 4,501,058 A | * | 2/1985 | Schutzler | 29/446 |
| 4,532,681 A | * | 8/1985 | Baker et al. | 403/28 |
| 4,596,483 A | * | 6/1986 | Gabriel | 403/28 |
| 4,625,998 A | * | 12/1986 | Draudt et al. | 285/7 |
| 4,796,420 A | * | 1/1989 | Gueli | 59/93 |
| 5,060,888 A | * | 10/1991 | Vezain et al. | 244/158 R |
| 5,119,555 A | * | 6/1992 | Johnson | 29/254 |
| 5,120,152 A | * | 6/1992 | Gueli | 403/179 |
| 5,122,020 A | * | 6/1992 | Bedi | 411/302 |
| 5,245,738 A | * | 9/1993 | Johnson | 29/413 |
| 5,254,967 A | * | 10/1993 | Biasutti et al. | 337/165 |
| 5,606,889 A | * | 3/1997 | Bielinski et al. | 74/2 |
| 5,621,373 A | * | 4/1997 | McCormick | 337/1 |
| 5,686,878 A | * | 11/1997 | Gueli | 337/416 |
| 5,748,066 A | * | 5/1998 | Holt | 337/1 |
| 5,927,890 A | * | 7/1999 | Job et al. | 403/2 |
| 6,133,818 A | * | 10/2000 | Hsieh et al. | 337/401 |
| 6,404,322 B1 | * | 6/2002 | Ruegsegger et al. | 337/416 |

* cited by examiner

Primary Examiner—Anatoly Vortman
(74) Attorney, Agent, or Firm—Blakely, Sokoloff, Taylor & Zafman

(57) ABSTRACT

The present invention provides a device forming a controlled-release mechanism, the device comprising: two structural elements suitable for relative movement; and locking means suitable initially for preventing relative movement between the two structural elements, and in which the locking means comprises in combination: at least one set of complementary shape means of helical configuration associated with respective ones of the two structural elements; and a low-melting point material disposed at least in part at an interface between two parts connected respectively to the two structural elements to prevent the locking means being released, and consequently to prevent the structural elements being released, prior to said material melting.

46 Claims, 3 Drawing Sheets

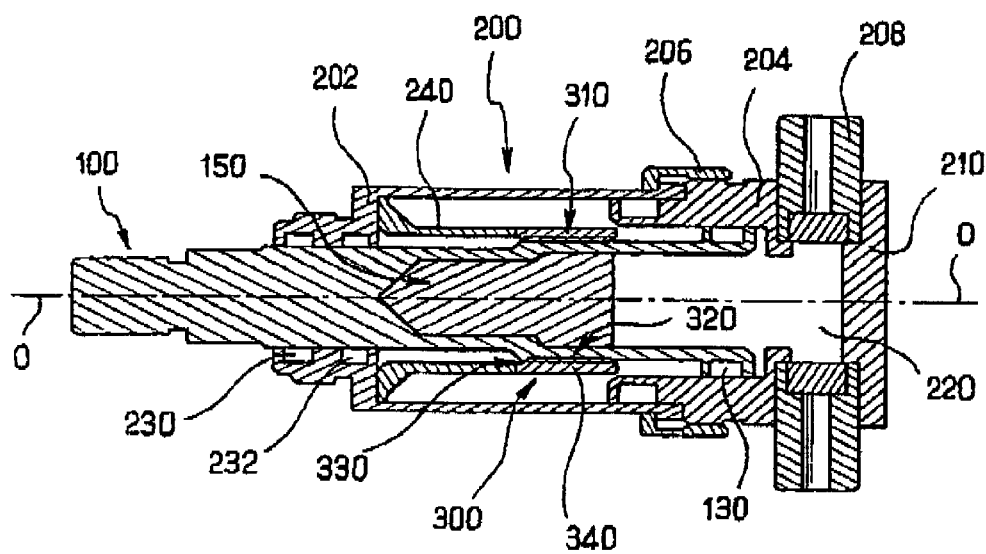
FIG_1
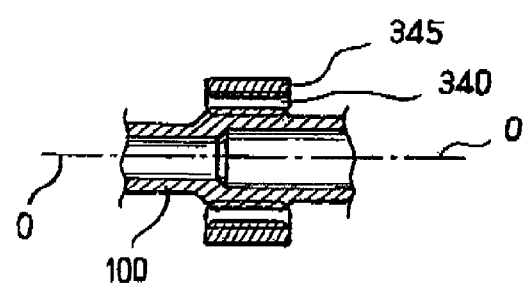
FIG_2

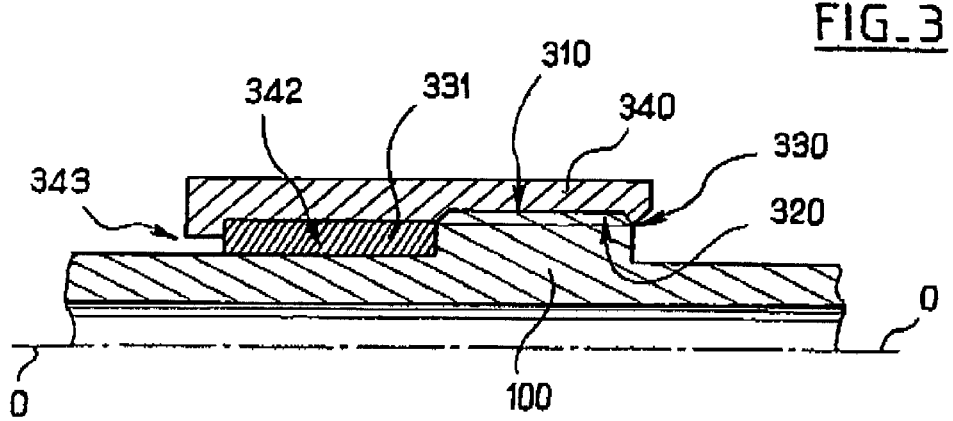
FIG._3
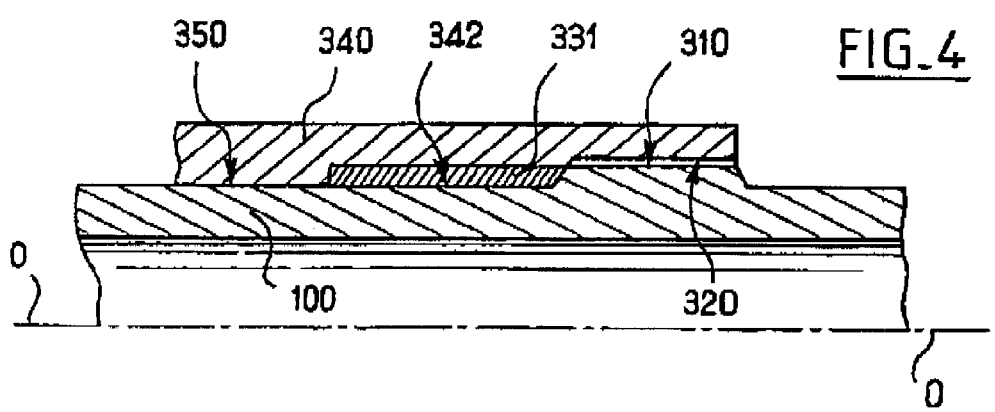
FIG._4
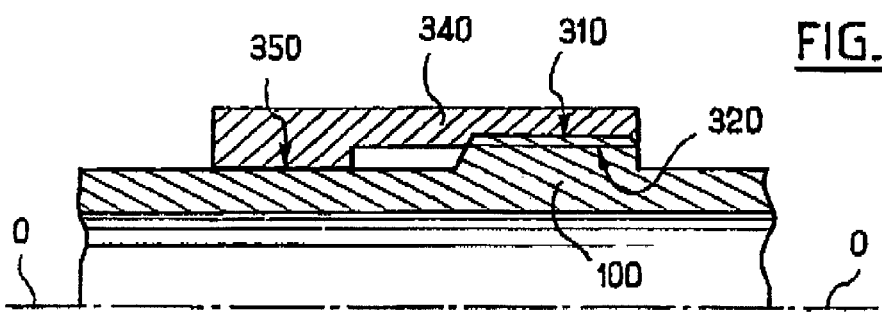
FIG._5

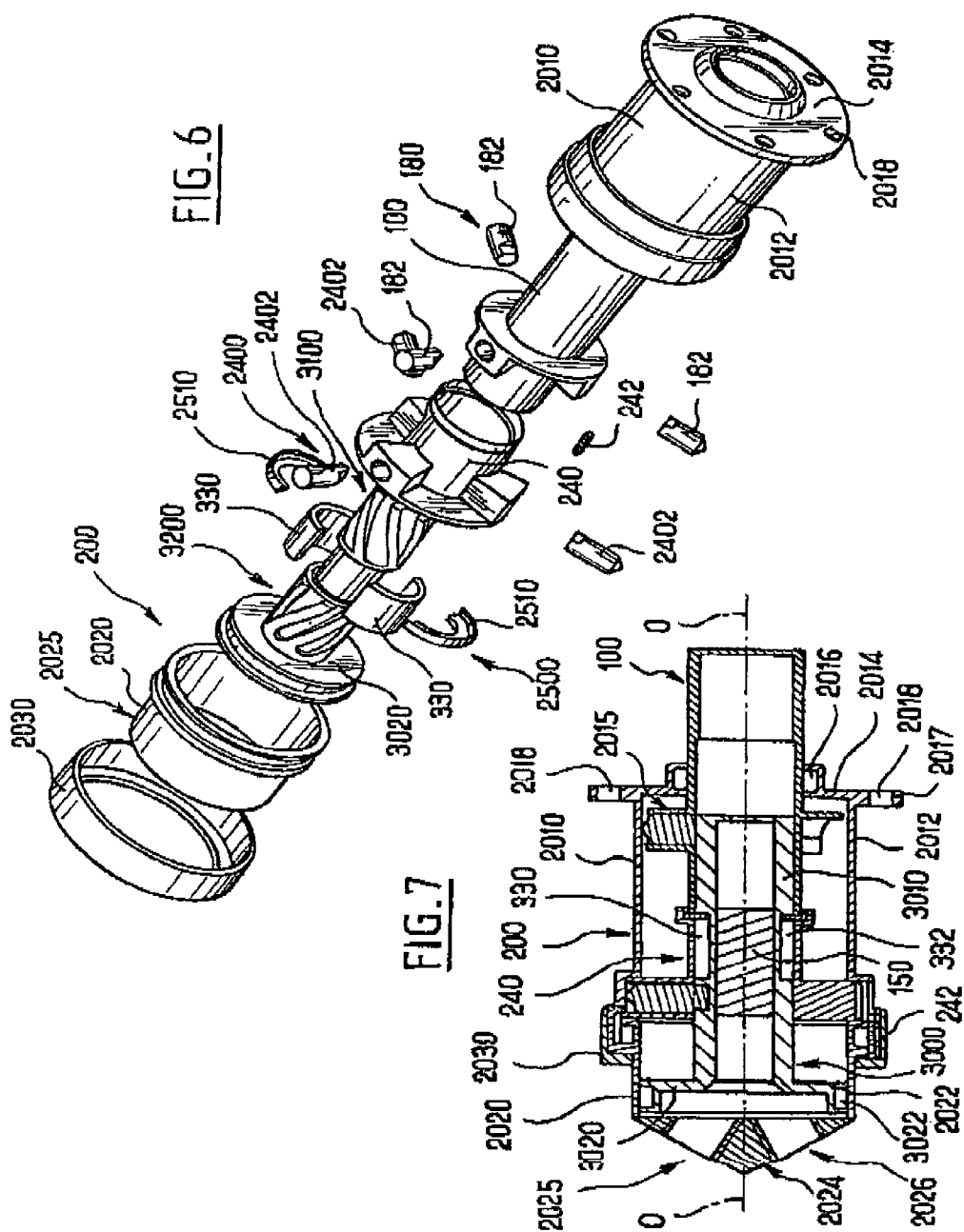

THERMAL-EFFECT CONTROLLED-RELEASE MECHANISM

The present invention relates to the field of thermal-effect controlled-release mechanisms.

FIELD OF THE INVENTION

The present invention relates particularly, but not exclusively, to pyromechanisms, i.e. to the field of mechanisms that are controlled by a pyrotechnic effect.

Numerous mechanisms for controlled release by a thermal effect have already been proposed.

OBJECTS AND SUMMARY OF THE INVENTION

An object of the present invention is to propose a device that presents properties superior to those of known prior devices.

A particular object of the present invention is to propose a device which presents high mechanical strength at rest.

These objects are achieved in the invention by a device comprising:
  two structural elements suitable for relative movement; and
  locking means suitable initially for preventing relative movement between the two structural elements, and in which the locking means comprises in combination:
    at least one set of complementary shape means of helical configuration associated with respective ones of the two structural elements; and
    a low-melting point material disposed at least in part at an interface between two parts connected respectively to the two structural elements to prevent the locking means being released, and consequently to prevent the structural elements being released, prior to said material melting.

Advantageously, according to another characteristic of the present invention, the complementary shape means of helical configuration comprise both threads and complementary tapping associated with respective ones of the two structural elements.

Advantageously, according to another characteristic of the present invention, the low-melting point material is disposed at least on a portion of the interface between the threads and the complementary tapping to prevent release of the locking means, and consequently to prevent release of the structural elements prior to said material melting.

BRIEF DESCRIPTION OF THE DRAWINGS

Other characteristics, objects, and advantages of the present invention appear on reading the following detailed description and on referring to the accompanying drawings given as non-limiting examples, and in which:

FIG. 1 is a diagrammatic axial longitudinal section view of a device constituting a preferred embodiment of the present invention;

FIG. 2 is a similar fragmentary view in longitudinal axial section showing a variant embodiment in accordance with the present invention;

FIGS. 3, 4, and 5 show three various embodiments in accordance with the present invention; and FIG. 6 is an exploded perspective view showing another variant embodiment of the present invention, while FIG. 7 is a longitudinal section view through the same variant.

MORE DETAILED DESCRIPTION

Accompanying FIG. 1 shows a device in accordance with the invention that comprises:
  a first structural element 100;
  a second structural element 200; and
  locking means 300.
  The locking means 300 comprise in combination:
    at least one set of complementary shape means advantageously constituted by threads 310 and complementary tapping 320, associated respectively with the two structural elements 100 and 200; and
    a low melting point material 330 placed at least over a fraction of the interface between the threads 310 and the complementary tapping 320 to prevent release of the locking means 300, and consequently of the structural elements 100 and 200 before said material 330 melts.

The structural elements 100 and 200 can be implemented in a wide variety of ways.

In the particular embodiment shown in accompanying FIG. 1, these two elements 100 and 200 are generally in the form of concentric cylindrical structures centered on an axis O—O, and they are also capable of moving in relative translation along the axis O—O after release of the locking means 300.

More precisely, the element 100 is generally in the form of a central rod, while the element 200 is generally in the form of a cylindrical jacket surrounding part of the rod 100.

In FIG. 1, the element 200 comprises an assembly of various parts 202, 204, 206, 208, and 210. Nevertheless, the invention is not limited to this particular configuration. Said parts 202 to 210 are therefore not described in detail below.

It should merely be observed that the parts 202 to 210 preferably define a closed chamber 220 at one of the ends of the rod 100.

The structure as formed in this way can constitute an actuator type assembly in which the rod 100 forms a piston capable of controlled movement in translation relative to the jacket 200 which forms an actuator cylinder.

Sealing means such as O-rings can be inserted between the two elements 100 and 200. Such sealing means can be received, for example, in annular grooves 130, 230, 232 formed in one or other of the two elements 100, 200 and open to the interface between them.

Nevertheless, the invention is not limited to devices in which the two structural elements are capable of movement in relative translation only. Thus, for example, the translation movement of the rod 100 could be replaced or transformed into any other appropriate movements, for example movement that is oblique or that is rotary relative to the element 200, using a screw-and-nut system or the equivalent.

In the example shown in FIG. 1, the threads 310 are provided on the outside surface of a segment of the rod 100. The tapping 320 is provided on the inside surface of a nut 340. The element 200 bears against the nut 340 via a spacer 240.

The spacer 240 is constituted by a bushing centered on the axis O—O.

The low melting point, material 330 can be implemented in numerous ways.

It can be a metal.

In this context, the material 330 is preferably selected from the group comprising:
  Bi50/Pb28/Sn22 (for a melting temperature of about 95° C. to 110° C.;

In (for a melting temperature of about 156° C.);

Sn or Sn85/Zn15 (for a melting temperature of about 200° C. to 250° C.);

Pb82.5/Cd17.5; or

Pb96/Sb4 (for a melting temperature of about 250° C. to 300° C.).

The use of a metal to form the material 330 amounts to soldering the nut 340 in place.

Nevertheless, the invention is not limited to a metal. The material 330 can be constituted by any other heat-meltable material capable of performing the same function, for example a material based on paraffin or on a eutectic alloy.

The threads 310 and the complementary tapping 320 are preferably reversible, i.e. the pitch of the thread is sufficient to enable traction exerted on the nut 340 and/or the rod 100 to drive unscrewing.

By way of non-limiting example, for a nut having an inside diameter of 17.5 millimeters (mm), 15 threads can be provided at a pitch of 15 mm.

The heater element suitable for melting the material 330 on demand can be implemented in numerous ways.

In a preferred embodiment, it is constituted by a block of pyrotechnic material 150 integrated in the structure.

Still more precisely, in the preferred embodiment shown in accompanying FIG. 1, the pyrotechnic material 150 is placed in an axial blind chamber 150 formed in the rod 100 and opening out into the chamber 220.

The pyrotechnic composition 150 can thus be constituted by:

$Al+Fe_2O_3$;

$Mg+Fe_2O_3$;

$Al+CuO$; or $Mg+CuO$.

The above-described device of the present invention operates essentially as follows.

At rest, the nut 340 is locked on the rod 100 by the material 330. The jacket 200 bears against the spacer 240, which in turns bears against the nut 340.

As a result the rod 100 cannot be pulled out from the jacket 200, i.e. to the left relative to the jacket 200 in the configuration shown in FIG. 1.

To release the device, it suffices to initiate the pyrotechnic composition 150 or any other equivalent heater means.

While the material 330 is in the melted state, the nut 340 is free.

The rod 100 can then b)e moved relative to the nut 340 and the jacket 200 by applying a suitable driving force. This force can be provided by the gas generated by the pyrotechnic composition 150 in the chamber 220.

It should be observed that during this movement, and where made possible by the clearance between the threads 310 and the tapping 320, the material 330 is throttled at the interface between the threads 310 and the tapping 320.

This throttling serves to brake the relative movement between the elements 100 and 200. This ensures that release of the mechanical stresses of the structure is controlled.

FIG. 3 shows a variant embodiment designed specifically for reinforcing the braking effect by throttling the material 330 when it melts. FIG. 3 shows the rod 100 engaged with the nut 340 via the mating threads 310/320 which are initially locked by being covered in a material 330. However, the nut shown in FIG. 3 defines a housing 342 suitable for containing a supply 331 of material 330, which housing 342 opens to the outside via a passage 343 of calibrated section. The housing 342 is defined in part by a step formed on the rod 100. Thus, after the material 330 has melted, relative movement between the elements 100 and 200 reduces the volume of the housing 342, thus causing the material 330 to be throttled by the passage 343.

It should be observed that the spacer enables the outer jacket 200 to be thermally insulated from the zone containing the pyrotechnic composition 150 which can reach a high temperature.

A particular but non-exclusive application of the present invention lies in the space industry, for example in launchers or satellites.

Naturally, the present invention is not limited to the particular embodiment described above, but extends to all variants within its spirit.

In particular, in an advantageous variant of the present invention, provision can be made for means that prevent relative rotation between the spacer 240 and the nut 340 when the device is operated.

In a first embodiment, as shown in FIG. 2, such means can be constituted by two superposed and mutually engaged nuts 340 and 345 of oppositely-handed pitch. A first nut 340 engages the threads 310 on the rod 100. It is in turn provided with threads on its outside surface engaging with the second nut 345. The second nut serves as a bearing surface for the spacer 240. The threads of both nuts 340 and 345 are initially locked by means of a low-melting point material. The two nuts 340 and 345 can both have the same pitch. However that is not essential.

In a second embodiment, a ball bearing or the equivalent can be interposed between the nut 340 and the spacer 240.

The combination of low-melting point material 330 and threads 310/320 makes it possible in the context of the present invention to benefit from the device presenting high mechanical strength at rest.

FIG. 4 shows a variant embodiment in which there can be seen the rod 100 engaged in a nut 340 by mating threads 310/320, the nut defining a housing 342 suitable for receiving a supply 331 of low-melting point material 330. In the variant of FIG. 4, the material 330 which locks the assembly does not cover the threads 310/320, but instead occupies an interface 350 that is circularly cylindrical and that is formed between the outside surface of the rod 100 and the inside surface of the nut 340 over a segment thereof which is separate from the threads 310/320.

FIG. 5 shows another variant embodiment in which there can be seen the rod 100 in screw engagement 310/320 with a nut 340. In this case, the nut 340 does not define a housing for containing a supply of low-melting point material as is the case in FIGS. 3 and 4. However, in the variant of FIG. 5, as in FIG. 4, the material 330 which locks the assembly is not placed between the threads 310/320, but at an interface 350 that is circularly cylindrical and that is formed between the outside surface of the rod 100 and the inside surface of the nut 340 over a segment that is distinct from the threads 310/320.

Naturally, in yet other variants, provision can be made initially to lock the assembly by means of a low-melting point material 330 that is present both between the threads 310/320 and at a cylindrical interface 350.

There follows a description of the variant shown in FIGS. 6 and 7.

In this variant, the device comprises two elements 100, 200 that are suitable for relative rotation about the axis O—O.

In the embodiment shown in FIGS. 6 and 7, the element 100 is in the form of a hollow cylindrical rod. The rod is prevented from moving in translation relative to the element 200, but it is free to rotate about the axis O—O relative to said element 200.

For this purpose, the rod 100 preferably bears at one end against a spacer 240 which is itself constrained to move in rotation and in translation with the element 200.

The connection defined between the spacer 240 and the element 200 can be defined by any appropriate means.

The spacer 240 is preferably prevented from moving in translation by being clamped between two bodies 2010, 2020 constituting the main parts of the second element 200. In addition, the spacer 240 is preferably prevented from moving in rotation relative to the body 200 by means of a pin 242, e.g. extending parallel to the axis O—O and interfering both the spacer 240 and with the element 200.

The other end of the hollow cylindrical rod 100 preferably bears against an end plate 2014 of the element 200.

More precisely, and as shown in FIG. 7, clearance is left between the rod 100 and the end plate 2014, under the reference 2015. Nevertheless, the resulting clearance or housing is occupied in practice by a bearing or by any other equivalent means for facilitating relative rotation between the rod 100 and the element 200.

The element 200 can be implemented in a wide variety of shapes and embodiments.

In the particular, non-limiting embodiment shown in the accompanying figures, the element 200 is formed by assembling together two bodies 2010 and 2020 by means of a nut or the equivalent 2030.

Still more precisely, and preferably, each of the two bodies 2010, 2020 comprises a cylindrical casing 2012, 2022 centered on the axis O—O and associated with a respective end plate 2014, 2024 extending perpendicularly to the axis O—O.

It should be observed that the end plate 2014 has a through central passage for receiving the rod 100 and allowing it to move. Where appropriate, sealing means can be provided at the interface between the end plate 2014 and the rod 100. By way of example, it is possible to use an O-ring or any equivalent means positioned in an annular groove 2016 formed in the end plate 2014.

The end plate 2014 preferably possesses an outwardly-extending flange 2017 provided with a plurality of through holes 2018 to enable the device to be fixed in place.

The end plate 2014 is designed to carry at least one initiator (not shown in order to simplify the figure).

More precisely, the end plate 2014 preferably possesses two housings 2025 and 2026 each designed to receive a respective initiator in order to provide redundancy and improved reliability.

The device shown in accompanying FIGS. 6 and 7 further comprises a piston 3000 placed inside the element 200 and functionally interposed in series between the two elements 100 and 200.

The piston 3000 preferably comprises a shaft 3010 secured to a collar 3020.

The shaft 3010 is designed to be engaged in a central channel of the element 100 to allow movement between these elements both in translation and in rotation.

The shaft 3010 itself possesses a central blind housing opening out to the, end plate 2024 and receiving a highly exothermal pyrotechnic composition 150.

The above-mentioned collar 3020 of the piston 3000 is adjacent to the end plate 2024. It provides sealing between the piston 3000 and the body 200 by any appropriate means, e.g. using an O-ring engaged in a peripheral annular groove 3022 formed in the outside surface of the collar 3020.

The piston 3000 possesses a series of outside threads on a segment 3100. The threads are adapted to co-operate with complementary means 180 associated with the rod 100 to transform translation movement of the piston 3000 along the axis O—O into rotation of the rod 100 about the axis O—O relative to the piston 3000.

The means 180 provided for this purpose on the rod 100 can be constituted by tapping.

Nevertheless, and as shown in FIGS. 6 and 7, these means are preferably constituted by at least one finger 182 extending radially relative to the axis O—O, contacting the rod 100, and engaged in the threads 3100.

Still more precisely, in the preferred embodiment, there are three fingers 182 uniformly distributed around the axis O—O. Naturally, the invention is not limited to this number of fingers nor to this particular disposition.

Still more precisely, the three above-mentioned fingers 182 are mounted to slide radially in complementary radial holes formed in the rod 100.

The piston 3000 also has a second set of threads on a segment 3200. These threads are adapted to co-operate with complementary means 2400 connected to the spacer 240 and to the body 200.

The pitch of the threads 3200 is opposite to that of the threads 3100.

These means serve to transform translation movement of the piston 3000 along the axis O—O into rotation of the piston 3000 about the axis O—O relative to the spacer 240 and to the element 200.

The above-specified means 2400 provided for this purpose on the spacer 240 can be constituted by tapping. Nevertheless, they are preferably constituted by at least one finger 2402 extending radially relative to the axis O—O, contacting the spacer 240 and engaged in the threads 3200.

Still more precisely, there are preferably three fingers 2402 uniformly distributed around the axis O—O.

Still more precisely, the fingers 2402 are mounted to slide radially in complementary radial holes formed in the spacer 240.

The device shown in FIGS. 6 and 7 further comprises a mass of low-melting point material 330 that solders together the piston 3000 and the spacer 240. This mass 330 of low-melting point material is placed in a housing 332 formed between the piston 3000 and the spacer 240.

Still more precisely, the housing 332 is formed by a peripheral groove made on the outside surface of the piston 3000 between the two threaded segments 3100 and 3200.

On examining accompanying FIGS. 6 and 7, it can be seen that the device is suitable for being associated with a ring 2500 (or more precisely two complementary half-rings 2510 for reasons of manufacture and assembly), which ring is prevented from moving at least in translation by being clamped between the spacer 240 and the rod 100, and is placed on one end of the housing 332. The person skilled in the art will understand that the ring 2500 throttles the low-melting point material 330 when the device is operated, since during movement in translation of the piston 3000 along the axis O—O relative to the element 200, the low-melting point material 330 is constrained to go past the ring 2500 through the narrow calibrated passage defined between the ring 2500 and the outside surface of the piston 3000.

The above-described device operates essentially as follows.

To operate the device, at least one of the initiators placed in the cavities 2025 or 2026 is activated. Initiation is thus transmitted to the pyrotechnic composition 150.

The low-melting point material 330 reaches it softening point. The piston 3000 is thus released relative to the spacer 240 and the element 200. In addition, the gas generated by the initiators placed in the cavities 2025 or 2026, or by the pyrotechnic composition 150, or indeed any other appropriate external means, urges the piston 3000 to move in translation along the axis O—O (to the right in the configuration shown in FIG. 7).

This movement is braked by the solder material 330 being throttled as it goes past the ring 2500.

The co-operation defined between the threads 3200 and the fingers 2402 transforms the movement in translation of the piston 3000 along the axis O—O into movement in rotation about the same axis.

In addition, the movement in translation of the piston 3000 is transformed by the co-operation defined between the threads 3100 and the fingers 182 into rotation relative to the rod 100.

Furthermore, the rotation of the piston 3000 is transmitted to the rod 100.

Thus, the two above-described transformations between translation and rotation as defined respectively between the means 3200 and 2402, and between the means 3100 and 182 are cumulative. This amplifies the rotary motion of the rod 100.

It should be observed that the device is again locked by the material 330 once it has cooled down.

Such a device can be used in numerous ways.

In a variant, the above-mentioned threads 3100, 2200 and complementary fingers 182, 2402 can be replaced for example by tapping formed respectively in the rod 100 and the spacer 240 together with complementary radially-extending fingers carried by the piston 3000.

What is claimed is:

1. A device forming a controlled-release mechanism, the device comprising:
   two structural elements suitable for relative movement; and
   locking means suitable initially for preventing relative movement between the two structural elements, and in which the locking means comprises in combination:
      at least one set of complementary shape means of helical configuration associated with respective ones of the two structural elements; and
   a low-melting point material disposed at least in part at an interface between two parts connected respectively to the two structural elements to prevent the locking means being released, and consequently to prevent the structural elements being released, prior to said material melting, said low-melting point material melting within a temperature range of about 95° C. to 300° C.

2. A device according to claim 1, wherein the complementary shape means of helical configuration have both threads and complementary tapping associated with respective ones of the two structural elements.

3. A device according to claim 1, wherein the low-melting point material is disposed at least on a portion of the interface between the complementary shape means to prevent release of the locking means, and consequently to prevent release of the structural elements prior to said material melting.

4. A device according to claim 2, wherein the tapping is formed in a nut.

5. A device according to claim 1, wherein a spacer is interposed between one of the structural elements and the locking means.

6. A device according to claim 1, wherein the low-melting point material is formed by a metal.

7. A device according to claim 6, wherein the low-melting point material is selected from the group comprising:

Bi50/Pb28/Sn22 (for a melting temperature of about 95° C. to 110° C.);

In (for a melting temperature of about 156° C.);

Sn or Sn85/Zn15 (for a melting temperature of about 200° C. to 250° C.);

Pb82.5/Cd17.5; or

Pb96/Sb4 (for a melting temperature of about 250° C. to 300° C.).

8. A device according to claim 1, wherein the low-melting point material is formed by a material based on paraffin or on a eutectic alloy.

9. A device according to claim 2, wherein the threads and the complementary tapping constitute reversible treads, i.e. threads of a pitch that is large enough to enable traction to drive unscrewing once the low-melting point material had melted.

10. A device according to claim 1, further comprising heater means suitable for selectively causing the low-melting point material to melt.

11. A device according to claim 10, wherein the heater element is formed by a pyrotechnic material integrated in the structure.

12. A device according to claim 1, wherein the two structural elements are suitable for moving in relative translation.

13. A device according to claim 1, including means for preventing relative rotation between the locking means and one of the structural elements when the device is operated.

14. A device according to claim 13, wherein the means preventing relative rotation comprise two mutually-engaged superposed nuts having Opposite pitches.

15. A device according to claim 13, wherein the means preventing relative rotation comprise a ball bearing or the equivalent.

16. A device according to claim 1, wherein the two structural elements are suitable for moving in relative rotation.

17. A device according to claim 16, including a piston suitable for moving in translation relative to the structural elements and provided with threads engaging means connected to a structural element.

18. A device according to claim 17, wherein the piston further comprises a second series of threads engaged with means connected to the second structural element.

19. A device according to claim 18, wherein the two series of threads are of opposite pitches.

20. A device according to claim 16, wherein the means engaged with the threads comprise at least one radial finger.

21. A device according to claim 17, wherein the threads are constituted by radial fingers secured to the piston.

22. A device according to claim 1, wherein at least one of the structural elements defines a housing suitable for housing a supply of low-melting point material, which housing opens to the outside via a passage of calibrated section and is suitable for reducing its volume during relative movement between the structural elements such that said movement causes the material to be throttled by the passage.

23. A device according to claim 1, having the low-melting point material at an interface other than the interface between the treads.

24. A device forming a controlled-release mechanism, the device comprising:
   two structural elements suitable for relative movement; and
   locking means suitable initially for preventing relative movement between the two structural elements, and in which the locking means comprises in combination:

at least one set of complementary shape means of helical configuration associated with respective ones of the two structural elements; and a low-melting point material means disposed at least in part at an interface between two parts connected respectively to the two structural elements to prevent the locking means being released, and consequently to prevent the structural elements being released, prior to said material melting.

25. A device according to claim 24, wherein the complementary shape means of helical configuration have both threads and complementary tapping associated with respective ones of the two structural elements.

26. A device according to claim 24, wherein the low-melting point material is disposed at least on a portion of the interface between the complementary shape means to prevent release of the locking means, and consequently to prevent release of the structural elements prior to said material melting.

27. A device according to claim 25, wherein the tapping is formed in a nut.

28. A device according to claim 24, wherein a spacer is interposed between one of the structural elements and the locking means.

29. A device according to claim 24, wherein the low-melting point material is formed by a metal.

30. A device according to claim 29, wherein the low-melting point material is selected from the group comprising:

Bi50/Pb28/Sn22 (for a melting temperature of about 95° C. to 110° C.);

In (for a melting temperature of about 156° C.);

Sn or Sn85/Zn15 (for a melting temperature of about 200° C. to 250° C.);

Pb82.5/Cd17.5; or

Pb96/Sb4 (for a melting temperature of about 250° C. to 300° C.).

31. A device according to claim 24, wherein the low-melting point material is formed by a material based on paraffin or on a eutectic alloy.

32. A device according to claim 25, wherein the threads and the complementary tapping constitute reversible threads, i.e. threads of a pitch that is large enough to enable traction to drive unscrewing once the low-melting point material had melted.

33. A device according to claim 24, further comprising heater means suitable for selectively causing the low-melting point material to melt.

34. A device according to claim 33, wherein the heater element is formed by a pyrotechnic material integrated in the structure.

35. A device according to claim 24, wherein the two structural elements are suitable for moving in relative translation.

36. A device according to claim 24, including means for preventing relative rotation between the locking means and one of the structural elements when the device is operated.

37. A device according to claim 36, wherein the means preventing relative rotation comprise two mutually-engaged superposed nuts having opposite pitches.

38. A device according to claim 36, wherein the means preventing relative rotation comprise a ball bearing or the equivalent.

39. A device according to claim 24, wherein the two structural elements are suitable for moving in relative rotation.

40. A device according to claim 39, including a piston suitable for moving in translation relative to the structural elements and provided with threads engaging means connected to a structural element.

41. A device according to claim 40, wherein the piston further comprises a second series of threads engaged with means connected to the second structural element.

42. A device according to claim 41, wherein the two series of threads are of opposite pitches.

43. A device according to claim 39, wherein the means engaged with the threads comprise at least one radial finger.

44. A device according to claim 40, wherein the threads are constituted by radial fingers secured to the piston.

45. A device according to claim 24, wherein at least one of the structural elements defines a housing suitable for housing a supply of low-melting point material, which housing opens to the outside via a passage of calibrated section and is suitable for reducing its volume during relative movement between the structural elements such that said movement causes the material to be throttled by the passage.

46. A device according to claim 24, having the low-melting point material at an interface other than the interface between the threads.

* * * * *